(12) United States Patent
Zhao

(10) Patent No.: US 10,664,666 B2
(45) Date of Patent: May 26, 2020

(54) LANGUAGE CONVERSION METHOD AND DEVICE BASED ON ARTIFICIAL INTELLIGENCE AND TERMINAL

(71) Applicant: BEIJING BAIDU NETCOM SCIENCE AND TECHNOLOGY CO., LTD., Beijing (CN)

(72) Inventor: Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 164 days.

(21) Appl. No.: 15/854,058

(22) Filed: Dec. 26, 2017

(65) Prior Publication Data

US 2018/0329894 A1 Nov. 15, 2018

(30) Foreign Application Priority Data

May 12, 2017 (CN) .......................... 2017 1 0336033

(51) Int. Cl.
*G06F 40/58* (2020.01)
*G06N 20/00* (2019.01)
(Continued)

(52) U.S. Cl.
CPC ............ *G06F 40/58* (2020.01); *G06F 40/279* (2020.01); *G06F 40/44* (2020.01); *G06F 40/45* (2020.01);
(Continued)

(58) Field of Classification Search
CPC .. G06F 17/28; G06F 17/2809; G06F 17/2818; G06F 17/2827; G06F 17/2836;
(Continued)

(56) References Cited

U.S. PATENT DOCUMENTS 4,750,122 A * 6/1988 Kaji .................... G06F 17/2735
704/1
6,393,389 B1 * 5/2002 Chanod ................ G06F 17/271
704/4
(Continued)

FOREIGN PATENT DOCUMENTS

CN 102662934 9/2012
CN 104102630 10/2014
(Continued)

OTHER PUBLICATIONS

Jiang, "Research on bilingual terminology extraction system based on parallel corpus," Modern Electronics Technique, Aug. 2016, vol. 39, No. 15, pp. 108-111.
(Continued)

*Primary Examiner* — Eric Yen
(74) *Attorney, Agent, or Firm* — Hodgson Russ LLP

(57) ABSTRACT

Provided are a language conversion method and device based on artificial intelligence, and a terminal. The language conversion method includes: receiving a language conversion request, wherein the language conversion request comprises a sentence to be converted, and the sentence to be converted comprises an original language word and a target language word; determining a plurality of candidate words each corresponding to the original language word according to a preset rule; determining a score of each of the plurality of candidate words when used in the sentence to be converted; and determining a target word corresponding to the original language word according to the score of each of the plurality of candidate words.

18 Claims, 2 Drawing Sheets

(51) Int. Cl.
*G06F 40/44* (2020.01)
*G06F 40/45* (2020.01)
*G06F 40/47* (2020.01)
*G06F 40/279* (2020.01)
*G06F 40/53* (2020.01)
*G06F 40/49* (2020.01)
*G06F 40/55* (2020.01)
*G06F 40/51* (2020.01)

(52) U.S. Cl.
CPC .............. *G06F 40/47* (2020.01); *G06F 40/49* (2020.01); *G06F 40/51* (2020.01); *G06F 40/53* (2020.01); *G06F 40/55* (2020.01); *G06N 20/00* (2019.01)

(58) Field of Classification Search
CPC ............ G06F 17/2845; G06F 17/2872; G06F 17/289; G06F 40/42; G06F 40/44; G06F 40/47; G06F 40/49; G06F 40/51; G06F 40/53; G06F 40/55
See application file for complete search history.

(56) References Cited

U.S. PATENT DOCUMENTS

| | | | | |
|---|---|---|---|---|
| 7,107,204 | B1* | 9/2006 | Liu | G06F 17/273 704/2 |
| 8,332,206 | B1* | 12/2012 | Sadovsky | G06F 17/2735 704/10 |
| 9,037,967 | B1* | 5/2015 | Al-Jefri | G06F 17/273 715/257 |
| 9,311,973 | B2* | 4/2016 | Kang | G11C 16/10 |
| 10,437,933 | B1* | 10/2019 | Clifton | G06F 17/289 |
| 2001/0029455 | A1* | 10/2001 | Chin | G06F 17/273 704/277 |
| 2002/0123982 | A1* | 9/2002 | Masuichi | G06F 17/2755 |
| 2002/0198701 | A1* | 12/2002 | Moore | G06F 17/28 704/2 |
| 2004/0039563 | A1* | 2/2004 | Suzuki | G06F 17/2872 704/2 |
| 2005/0125218 | A1* | 6/2005 | Rajput | G06F 17/2765 704/8 |
| 2006/0015318 | A1* | 1/2006 | Moore | G06F 17/2818 704/2 |
| 2008/0004863 | A1* | 1/2008 | Moore | G06F 17/2827 704/4 |
| 2009/0106015 | A1* | 4/2009 | Li | G06F 17/2818 704/2 |
| 2009/0319257 | A1* | 12/2009 | Blume | G06F 17/278 704/7 |
| 2010/0241416 | A1* | 9/2010 | Jiang | G06F 17/2872 704/7 |
| 2012/0253785 | A1* | 10/2012 | Hamid | G06F 17/2229 704/4 |
| 2013/0144593 | A1* | 6/2013 | Och | G06F 17/2845 704/2 |
| 2013/0211825 | A1* | 8/2013 | Tseng | G06F 17/2735 704/10 |
| 2014/0343920 | A1* | 11/2014 | Srinivasan | G06F 17/271 704/9 |
| 2015/0309984 | A1* | 10/2015 | Bradford | G06F 17/2863 704/8 |
| 2016/0019816 | A1* | 1/2016 | Parry | G09B 19/06 704/2 |
| 2017/0031901 | A1* | 2/2017 | Song | G06F 17/2705 |
| 2018/0089172 | A1* | 3/2018 | Needham | G06F 17/289 |

FOREIGN PATENT DOCUMENTS

| | | |
|---|---|---|
| CN | 105068998 | 11/2015 |
| CN | 106649288 | 5/2017 |

OTHER PUBLICATIONS

SIPO, First Office Action for CN Application No. 201710336033.7, dated Nov. 28, 2019.

* cited by examiner

LANGUAGE CONVERSION METHOD AND DEVICE BASED ON ARTIFICIAL INTELLIGENCE AND TERMINAL

CROSS-REFERENCE TO RELATED APPLICATION

This application claims a priority to and benefits of Chinese Patent Application Serial No. 201710336033.7, filed with the State Intellectual Property Office of P. R. China on May 12, 2017, the entire content of which is incorporated herein by reference.

FIELD

The present disclosure relates to the field of computer technology, and more particularly to a language conversion method based on artificial intelligence, a language conversion device based on artificial intelligence and a terminal.

BACKGROUND

Artificial Intelligence, AI for short, is a new technical science to study and develop theories, methods, techniques and application systems for simulating, extending and expanding human intelligence. The AI is a branch of computer science, which attempts to understand the essence of intelligence and to produce a new intelligent machine capable of acting as a human. The researches in this field include robots, speech recognition, image recognition, natural language processing and expert systems, etc.

It is a common situation that a user knows how to organize most words for expressing a sentence except a certain word when writing in a foreign language. For example, when the user wants to express a Chinese sentence "本文提出了一种将统计机器 翻译和神经网络 机器翻译机 结合的新方法" in English, he/she knows the sentence will be expressed as "This paper proposes a novel method that 结合 statistical machine translation and neural machine translation", but does not know which English word corresponding to "结合" is most appropriate.

In the related art, the user needs to query the certain word in the sentence with a dictionary, or translate the whole sentence with a machine translation tool. However, in the former case, several different words may be obtained, from which the user needs to identify which one is most consistent with the context; in the latter case, it will give a raw translated sentence with defects, such as an incorrect word order or an incorrect sentence pattern, which needs to be optimized by user's analysis, thus determining a final translated sentence. Therefore, owing to complex operations and low efficiency, the language conversion method in the related art cannot directly provide users with accurate conversion results, thus cannot meet users' needs with poor user experiences.

SUMMARY

Embodiments of the present disclosure are to provide a language conversion method based on AI, which achieves conversion from the sentence to be converted which includes the original language word and the target language word to the target language type sentence with simplified user's operations and improved conversion efficiency and accuracy, thereby better meeting user requirements and improving the user experience.

Embodiments of the present disclosure are to provide a language conversion device based on AI.

Embodiments of the present disclosure are to provide a terminal.

Embodiments of the present disclosure are to provide a computer-readable storage medium.

Embodiments of the present disclosure are to provide a computer program product.

Embodiments of a first aspect of the present disclosure provide a language conversion method based on AI, which includes: receiving a language conversion request, wherein the language conversion request includes a sentence to be converted, and the sentence to be converted includes an original language word and a target language word; determining a plurality of candidate words each corresponding to the original language word according to a preset rule; determining a score of each of the plurality of candidate words when used in the sentence to be converted; and determining a target word corresponding to the original language word according to the score of each of the plurality of candidate words.

Embodiments of a second aspect of the present disclosure provides a language conversion device based on AI, including: a receiving module, configured to receive a language conversion request, wherein the language conversion request includes a sentence to be converted, and the sentence to be converted includes an original language word and a target language word; a first determining module, configured to determine a plurality of candidate words each corresponding to the original language word according to a preset rule; a second determining module, configured to determine a score of each of the plurality of candidate words when used in the sentence to be converted; and a third determining module, configured to determine a target word corresponding to the original language word according to the score of each of the plurality of candidate words.

Embodiments of a third aspect of the present disclosure provides a terminal, including: a processor; and a memory having stored therein computer programs that, when executed by the processor, causes the processor to perform the language conversion method based on AI as described in embodiments of the first aspect of the present disclosure.

Embodiments of a fourth aspect of the present disclosure provides a computer-readable storage medium having stored therein computer programs that, when executed by a processor of a mobile terminal, causes the mobile terminal to perform the language conversion method based on AI as described in embodiments of the first aspect of the present disclosure.

Embodiments of a fifth aspect of the present disclosure provides a computer program product having stored therein instructions that, when executed by a processor, causes the processor to perform the language conversion method based on AI as described in embodiments of the first aspect of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
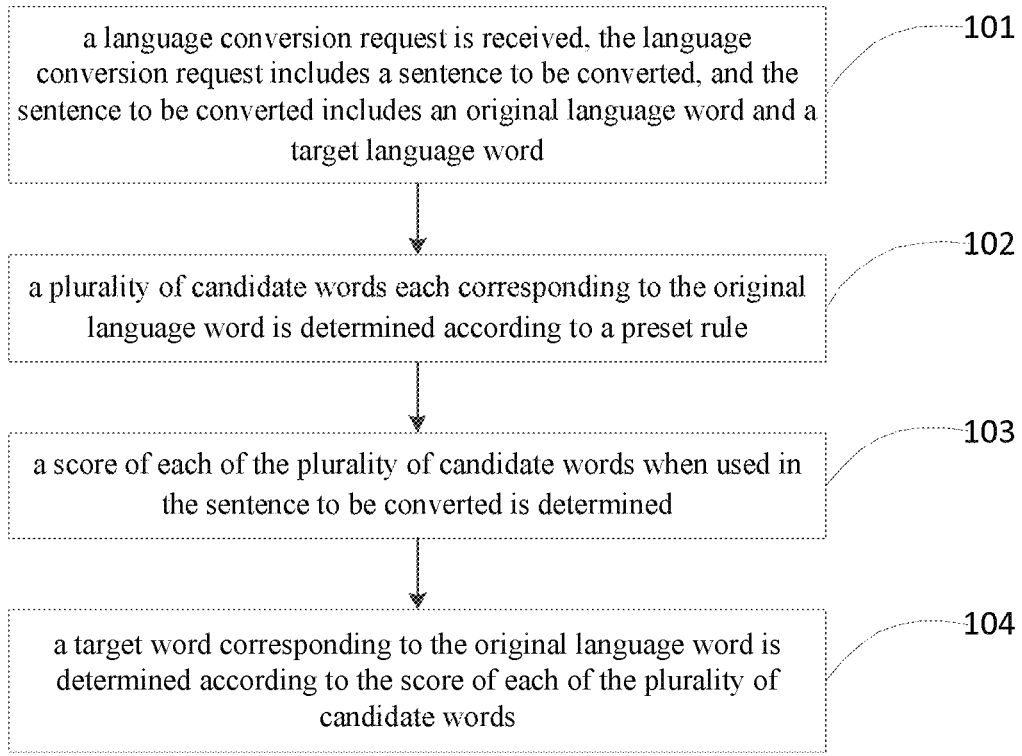
FIG. 1 is a flow chart of a language conversion method based on AI according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It would be appreciated that, it is a common situation that a user knows how to organize most words for expressing a sentence except a certain word when writing in a foreign language. In the related art, the user needs to query the certain word in the sentence with a dictionary, or translate the whole sentence with a machine translation tool, both of which have disadvantages of complex operations and low efficiency, and cannot provide users with accurate conversion results, thus cannot meet users' needs with poor user experiences.

In specific, directing the above problems, embodiments of the present disclosure provides a language conversion method based on AI. With the language conversion method based on AI according to embodiments of the present disclosure, the plurality of candidate words each corresponding to an original language word are determined according to the language conversion request received, the score of each of the plurality of candidate words when used in the sentence to be converted is determined, and the target word corresponding to the original language word is determined according to the score of each of the plurality of candidate words. Therefore, conversion from the sentence to be converted which includes the original language word and the target language word to the target language type sentence is realized with simplified user's operations and improved conversion efficiency and accuracy, thereby better meeting user requirements and improving the user experience.

In the following, a language conversion method and device based on AI and a terminal according to embodiments of the present disclosure will be described in detail with reference to drawings.

FIG. 1 is a flow chart of a language conversion method based on AI according to an embodiment of the present disclosure.

As shown in FIG. 1, the language conversion method based on AI includes the followings.

Block 101, a language conversion request is received, the language conversion request includes a sentence to be converted, and the sentence to be converted includes an original language word and a target language word.

An executive subject of the language conversion method based on AI according to an embodiment of the present disclosure is a language conversion device based on AI according to an embodiment of the present disclosure, and the device may be configured in any terminal to improve language conversion quality and effect.

In a specific implementation, the language conversion device based on AI may be set with an input interface, such that a user may input a sentence to be converted into the input interface when encountering a common situation that a user knows how to organize most words for expressing a sentence except a certain word when writing in a foreign language, where the sentence to be converted includes an original language word and a target language word, i.e., the user may input a raw translated sentence including a certain word which he/she does not know how to translate into the input interface.

The original language word refers to a word to be converted in an original language type.

The target language word refers to a word translated by the user in a target language type.

For example, if the user wants to express a Chinese sentence "本文提出了 种将统计机器 翻译和神经网络机 器翻译相结合 的新方法" in English, and he/she knows the sentence will be expressed as "This paper proposes a novel method that 结合 statistical machine translation and neural machine translation", but does not know which English word corresponding to "结合" is most appropriate, then the user may input the sentence "This paper proposes a novel method that 结合 statistical machine translation and neural machine translation" to be converted into the input interface of the language conversion device based on AI. In this example, "结合" is the original language word in the sentence to be converted, and other English words are the target language words in the sentence to be converted.

In a specific implementation, in order to guarantee language conversion speed and quality, the sentence to be converted cannot include too much original language words. Therefore, in embodiments of the present disclosure, the original language word and the target language word included in the sentence to be converted are in a certain ratio, and the ratio is lower than a first threshold.

In an embodiment, the first threshold may be determined as required. For example, in order to guarantee the language conversion speed and quality, the first threshold may be set to be a small value, such as 40%, that is, if 14 words are included in the sentence to be converted, the number of the original language words included therein should be less than 4.

Furthermore, the user may set an original language type and a target language type when inputting the sentence to be converted into the input interface of the language conversion device based on AI, such that the language conversion device based on AI may determine a word corresponding to the original language type and a word corresponding to the target language type in the sentence to be converted as the original language word and the target language word after receiving the language conversion request.

Alternatively, the language conversion device based on AI may also determine the original language word and the target language word according to the number of words in each language type in the sentence to be converted after receiving the language conversion request.

In the sentence to be converted, as the number of the original language words is less than that of the target language words under common cases for guaranteeing the language conversion speed and quality, therefore, in embodiments of the present disclosure, words in less number and corresponding to one language type may be determined as the original language words, and words in larger number and corresponding to another language type may be determined as the target language words.

For example, it is assumed that the sentence to be converted in the language conversion request is "This paper proposes a novel method that 结合 statistical machine translation and neural machine translation", as the number of words in Chinese is 1 and the number of words in English is 14, i.e., the number of words in Chinese is less than the number of words in English, it is determined that the word in Chinese is the original language word and words in English are the target language words based on the number of words in Chinese and the number of words in English.

Block 102, a plurality of candidate words each corresponding to the original language word is determined according to a preset rule.

Specifically, the plurality of candidate words each corresponding to the original language word may be determined according to the following methods.

Method 1

The plurality of candidate words each corresponding to the original language word is determined according to a preset language alignment model.

The language alignment model may be a statistical word alignment model or other alignment models.

In a specific implementation, the language alignment model may be generated by training, and then the plurality of candidate words each corresponding to the original language word is determined according to the language alignment model generated. That is, prior to determining the plurality of candidate words each corresponding to the original language word according to the preset language alignment model, the language conversion method further includes: acquiring a parallel corpus between an original language type word and a target language type word in a general field; and training the parallel corpus and determining an alignment model corresponding to the original language word.

Term "general field" used herein refers to all fields including academic papers, office documents, mails and various disciplines and so on.

Term "parallel corpus" used herein includes texts in two intertranslatable language types and may reflect correspondence information between the two intertranslatable language types in multi-levels, such as in words, phrases and sentences and so on.

In addition, in the parallel corpus, correspondence between the original language type word and a target language type word may be one-to-one, many-to-one, one-to-many, and many-to-many.

For example, it is assumed that the original language type is Chinese and the target language type is English, the parallel corpus may include such as "结合" and its correspondences "combine", "combines", "bind to", "integrates", "integrate"; "学习" and its correspondences "learning", "learn", "study", "be taught", "be trained", "cram", "prep", "revise", "gain knowledge"; or "学习", "学", "学会", "得知", "记住", "知悉", "读", "读书", "树立", "探析" and their common correspondence "learn", and the like.

In a specific implementation, a large number of parallel corpuses for the original language type words and the target language type words in the general field are acquired according to the language types of the original language word and the target language word, and the parallel corpuses are trained to generate language alignment models, such that an alignment model corresponding to the original language word can be determined by means of a phrase extraction method according to the original language word in the sentence to be converted after the language conversion request is received.

After determining the alignment model corresponding to the original language word, the language conversion device based on AI may determine a word with an alignment probability to the original language word greater than a second threshold to be the candidate word according to the alignment model.

Term "alignment probability" used herein refers to a probability of translating the original language word into an individual target language type word.

It would be appreciated that, several target language type words each corresponding to the original language word and alignment probabilities of individual target language type words to the original language word are obtained according to the alignment model corresponding to the original language word, and then the word with the alignment probability to the original language word greater than the second threshold is determined to be the candidate word according to the individual alignment probabilities.

For example, it is assumed that the original language type is Chinese, the target language type is English, the original language word is "结合", and the second threshold is 0.1. It is determined according to the alignment model corresponding to the original language word that, several target language type words each corresponding to the original language word "结合" are "combine", "combines", "bind to", "integrates" and "integrate", and the alignment probabilities of individual target language type words to the original language word are $P_1=0.2$, $P_2=0.3$, $P_3=0.05$, $P_4=0.4$ and $P_5=0.05$, respectively. As $P_1$, $P_2$ and $P_4$ all are greater than 0.1, target language type words "combine", "combines" and "integrates" respectively corresponding to the alignment probabilities $P_1$, $P_2$ and $P_4$ are determined to be the candidate words.

It should be noted that, the second threshold may be determined as required. For example, an alignment result of the original language word in parallel corpus in the general field determined according to the alignment model corresponding to the original language word may have a poor coverage in a specific field, i.e., a candidate word has a low alignment probability to the original language word for the specific field, in such a case, the second threshold may be set to be a lower value, so as to avoid the candidate word with the low alignment probability to the original language word from being filtered out directly.

For example, it is assumed that the alignment probabilities of individual target language type words to the original language word determined according to the alignment model corresponding to the original language word are $P_1=0.05$, $P_2=0.41$, $P_3=0.39$, $P_4=0.05$, $P_5=0.07$ and $P_6=0.03$, respectively, where target language type words corresponding to $P_1$, $P_4$, $P_5$ and $P_6$ belong to A field, and target language type words corresponding to $P_2$ and $P_3$ belong to B field, as the alignment probabilities of individual candidate words in the A field are lower, the second threshold may be set to be a lower value, such as 0.01, so as to avoid those target language type words in the A field from being filtered out directly.

Method 2

The plurality of candidate words each corresponding to the original language word is determined according to a linguistic model.

The linguistic model may be an n-gram model, a maximum entropy model, a maximum entropy Markov model, a neural network model, and so on.

It would be appreciated that, with the linguistic model, it is possible to determine a word most likely to appear in a sentence. Therefore, in embodiments of the present disclosure, a plurality of target language type words each corresponding to the original language word in a target field can be determined at first, and then a possibility of each of the plurality of target language type words appearing in the sentence to be converted is determined according to a linguistic model of each of the plurality of target language type words in the target field, so that target language type words with high possibilities are determined to be the candidate words corresponding to the original language word.

Correspondingly, in embodiment of the present disclosure, prior to determining the plurality of candidate words each corresponding to the original language word according to a linguistic model, the language conversion method further includes analyzing the target language word in the sentence to be converted to determine a target field to which the sentence to be converted belongs. Therefore, the plurality of target language type words each corresponding to the original language word in the target field is determined, and the linguistic model in the target field is selected from individual linguistic models in individual fields obtained in advance by training a large amount of monolingual corpuses in individual fields, and further the plurality of candidate words each corresponding to the original language word is determined according to the selected linguistic model.

Alternatively, as several words are given, it is possible to predict the next word most likely to appear with the linguistic model. Therefore, in embodiments of the present disclosure, a target language type word likely to appear following a target language word just before the original language word in the sentence to be converted can be predicted according to the linguistic model in the target field. Therefore, after determining the plurality of target language type words each corresponding to the original language word in the target field, the plurality of target language type words determined can be matched with the predicted target language type words likely to appear, so that a target language type word with a higher matching degree can be determined to be the candidate words.

Alternatively, comprehensively according to the determined possibilities of the plurality of target language type words each corresponding to the original language word in the target field appearing in the sentence to be converted, and according to the determined matching degrees of the plurality of target language type words each corresponding to the original language word in the target field with the predicted target language type words likely to appear, a target language type word with both a higher possibility appearing in the sentence to be converted and a higher matching degree is determined to be the candidate word.

It should be noted that, in embodiments of the present disclosure, the plurality of candidate words each corresponding to the original language word may be determined with the method 1 or the method 2 or a combination of the method 1 and the method 2.

It would be appreciated that, if determining the plurality of candidate words each corresponding to the original language word with method 1, a certain target language type word which has a lower alignment probability to the original language word but is the most correct expression form of the original language word in the sentence to be converted will be filtered out, this case however can be avoided by using the method 2 or the combination of method 1 and the method 2, thereby ensuring the language conversion accuracy and reliability.

Block 103, a score of each of the plurality of candidate words when used in the sentence to be converted is determined.

Block 104, a target word corresponding to the original language word is determined according to the score of each of the plurality of candidate words.

It would be appreciated that, after the plurality of candidate words are determined according to the preset rule, the scores of individual candidate words in context, when the original language word in the sentence to be converted is translated into the individual candidate words, is determined and a candidate word with a highest score is determined to be the target word corresponding to the original language word. Further, the sentence to be converted including the original language word and the target language word is converted to the target language type sentence by replacing the original language word with the target word.

With the language conversion method based on AI according to embodiments of the present disclosure, the plurality of candidate words each corresponding to an original language word are determined according to the language conversion request received and the preset rule, the score of each of the plurality of candidate words when used in the sentence to be converted is determined, and the target word corresponding to the original language word is determined according to the score of each of the plurality of candidate words. Therefore, with the alignment model and the linguistic model, conversion from the sentence to be converted which includes the original language word and the target language word to the target language type sentence is realized with simplified user's operations and improved conversion efficiency and accuracy, thereby better meeting user requirements and improving the user experience.

It can be seen from the above descriptions that, the plurality of candidate words each corresponding to the original language word in the sentence to be converted is determined first, then the target words is determined according to the score of each of the plurality of candidate words when used in the sentence to be converted, such that the sentence to be converted which includes the original language word and the target language word is converted into the target language type sentence. In the following, a step of determining the score of each of the plurality of candidate words when used in a sentence to be converted, in the language conversion method based on AI, will be described in detail with reference to FIG. 2.

Figure 2:
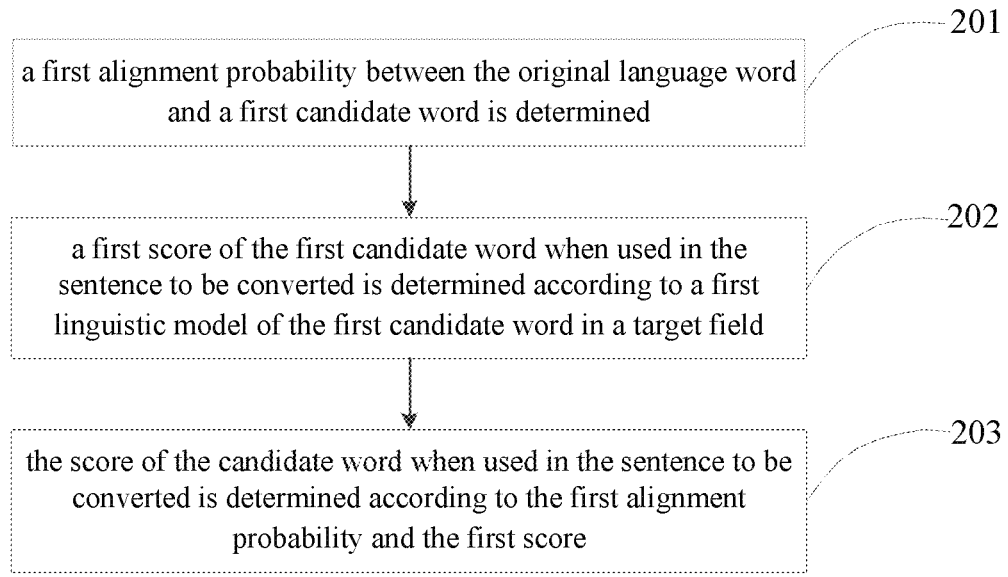
FIG. 2 is a flow chart showing determination of a score of each of a plurality of candidate words when used in a sentence to be converted, according to an embodiment of the present disclosure.

FIG. 2 is a flow chart showing determination of the score of each of the plurality of candidate words when used in the sentence to be converted, according to an embodiment of the present disclosure.

As shown in FIG. 2, the determination of the score includes the followings.

Block 201, a first alignment probability between the original language word and a first candidate word is determined.

In a specific implementation, the first alignment probability between the original language word and the first candidate word may be determined according to the alignment model corresponding to the original language word as described above.

Block 202, a first score of the first candidate word when used in the sentence to be converted is determined according to a first linguistic model of the first candidate word in a target field.

The first linguistic model may be a word representation language model based on deep learning, or a word-based language model, which will not be limited herein.

In embodiments of the present disclosure, the first score of the first candidate word when used in the sentence to be converted may be determined with a Continuous Bag-of-Words Model (CBOW).

It should be illustrated that, in embodiments of the present disclosure, linguistic models in individual fields need to be obtained first by training a large amount of monolingual corpuses in individual fields, such that the first linguistic model of the first candidate word in the target field can be selected from the linguistic models in individual fields obtained by training after analyzing the target language word in the sentence to be converted and determining the target field to which the sentence to be converted belongs, further, the first score of the first candidate word when used in the sentence to be converted is determined according to the first linguistic model.

In the following, a process of determining the first score of the first candidate word when used in the sentence to be converted with the CBOW model of the first candidate word in the target field will be described in detail with reference to FIG. 3.

Figure 3:
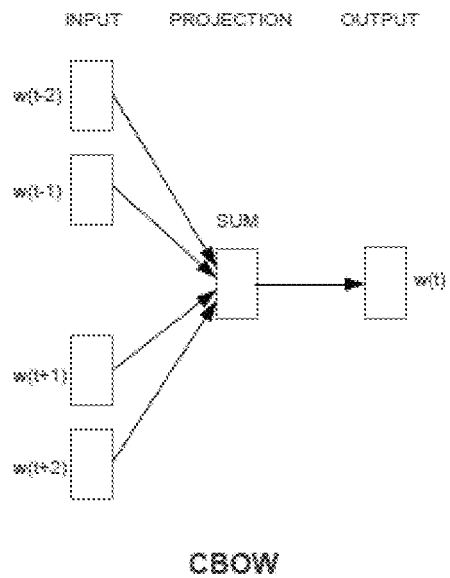
FIG. 3 is a schematic diagram of a CBOW model according to an embodiment of the present disclosure.

FIG. 3 is a schematic diagram of the CBOW model, as shown in FIG. 3, the CBOW model mainly includes an input layer, a projection layer and an output layer. The input layer is word representation for (n−1) words around a word w(t), for example, supposing that n=5, w(t−2),w(t−1) are two words before the word w(t), and w(t+1),w(t+2) are two words after the word w(t).

CBOW models in individual fields need to be obtained first by training a large amount of monolingual corpuses in individual fields, such that the CBOW model of the first candidate word in the target field can be selected from the CBOW models in individual fields obtained after the language conversion request is received and the target field to which the sentence to be converted belongs is determined by analyzing the target language word in the sentence to be converted, further, the first score of the first candidate word when used in the sentence to be converted is determined according to the selected CBOW model and target language words in the sentence to be converted before and after the original language word.

Block 203, the score of the candidate word when used in the sentence to be converted is determined according to the first alignment probability and the first score.

Specifically, a score of a $j^{th}$ candidate word corresponding to an $i^{th}$ original language word when the $j^{th}$ candidate word is used in the sentence to be converted can be determined according to an alignment probability between the $i^{th}$ original language word and the $j^{th}$ candidate word, a preset parameter, and a score of the $j^{th}$ candidate word in the target field to which the sentence to be converted belongs, where the score of the $j^{th}$ candidate word in the target field to which the sentence to be converted belongs is determined according to a linguistic model of the $j^{th}$ candidate word in the target field to which the sentence to be converted belongs.

In a specific implementation, after the alignment probability between the $i^{th}$ original language word and the $j^{th}$ candidate word, the preset parameter, and the score of the $j^{th}$ candidate word in the target field to which the sentence to be converted belongs are determined, the score of the $j^{th}$ candidate word corresponding to the $i^{th}$ original language word when the $j^{th}$ candidate word is used in the sentence to be converted may be determined with a log-linear model of a two dimensional table.

For example, the score of the first candidate word when used in the sentence to be converted is determined according to $f(s_i,t_{ij},stn)=\lambda \log f_r(s_i, t_{ij})+(1-\lambda) \log f_l(t_{ij}, stn)$, where $f(s_i,t_{ij},stn)$ is the score of the $j^{th}$ candidate word $t_{ij}$ corresponding to the $i^{th}$ original language word $s_i$ when the $j^{th}$ candidate word $t_{ij}$ is used in the sentence stn to be converted, $f_r(s_i,t_{ij})$ is the alignment probability between the $i^{th}$ original language word $s_i$ and the $j^{th}$ candidate word $t_{ij}$, $f_l(t_{ij},stn)$ is the score of the $j^{th}$ candidate word in the target field determined according to the linguistic model of the $j^{th}$ candidate word $t_{ij}$ in the target field to which the sentence stn to be converted belongs, and $\lambda$ is the preset parameter.

It should be illustrated that, in embodiments of the present disclosure, other computing method may also be used to determine the score of the first candidate word when used in the sentence to be converted, which will not be limited in embodiments of the present disclosure.

Specifically, $\lambda$ may be set as required.

In a specific implementation, if $\lambda$ is predetermined, the score $f(s_i,t_{ij},stn)$ of the first candidate word when used in the sentence to be converted may be determined by replacing $f_r(s_i,t_{ij})$ and $f_l(t_{ij},stn)$ with the first alignment probability and the first score, respectively.

The score of each of the plurality of candidate words determined in embodiments hereinbefore when used in the sentence to be converted can be determined by repeating the above processes. Further, the candidate word with the highest score is determined as the target word corresponding to the original language word.

It should be noted that, in embodiments of the present disclosure, after the target field to which the sentence to be converted belongs is determined by analyzing the target language word in the sentence to be converted, the score of each of the plurality of candidate words when used in the sentence to be converted can be determined directly according to the linguistic model of each of the plurality of candidate words in the target field, that is, $\lambda$ in $f(s_i,t_{ij},stn)=\lambda \log f_r(s_i,t_{ij})+(1-\lambda)\log f_l(t_{ij},stn)$ may be set to be 0, such that the score of each of the plurality of candidate words when used in the sentence to be converted may be determined according to $f(s_i,t_{ij},stn)=\log f_l(t_{ij},stn)$.

With the language conversion method based on AI according to embodiments of the present disclosure, the first alignment probability between the original language word and the first candidate word is determined firstly, the first score of the first candidate word when used in the sentence to be converted is determined secondly according to the first linguistic model of the first candidate word in the target field; and the score of the candidate word when used in the sentence to be converted is determined finally according to the first alignment probability and the first score. Therefore, by determining the score of each of the plurality of candidate words when used in the sentence to be converted with the alignment model and the linguistic model and further determining the target word corresponding to the original language word, conversion from the sentence to be converted which includes the original language word and the target language word to the target language type sentence is realized with simplified user's operations and improved conversion efficiency and accuracy, thereby better meeting user requirements and improving the user experience.

Figure 4:
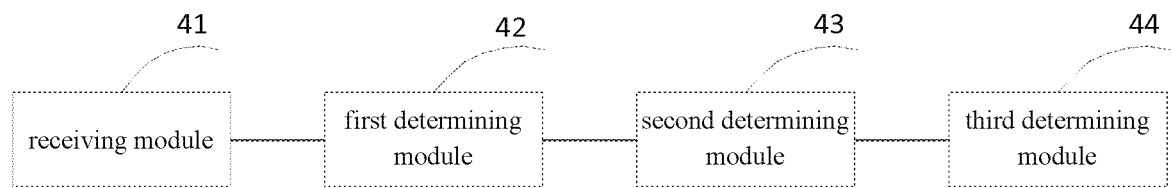
FIG. 4 is a schematic diagram of a language conversion device based on AI according to an embodiment of the present disclosure.

FIG. 4 is a schematic diagram of a language conversion device based on AI according to an embodiment of the present disclosure As shown in FIG. 4, the language conversion device based on AI includes a receiving module 41, a first determining module 42, a second determining module 43 and a third determining module 44.

The receiving module 41 is configured to receive a language conversion request. The language conversion request includes a sentence to be converted, and the sentence to be converted includes an original language word and a target language word.

The first determining module 42 is configured to determine a plurality of candidate words each corresponding to the original language word according to a preset rule.

The second determining module 43 is configured to determine a score of each of the plurality of candidate words when used in the sentence to be converted.

The third determining module 44 is configured to determine a target word corresponding to the original language word according to the score of each of the plurality of candidate words.

Specifically, the language conversion device based on AI according to this embodiment may be configured in any terminal to execute the language conversion method based on AI according to the above-mentioned embodiments, so as to improve language conversion quality and effect.

In an embodiment, a ratio of the original language word to the target language word in the sentence to be converted is lower than a first threshold.

In an implementation of embodiments of the present disclosure, the first determining module 42 is specifically configured to determine the plurality of candidate words each corresponding to the original language word according to a preset language alignment model or according to a linguistic model.

In another implementation of embodiments of the present disclosure, the first determining module 42 is further configured to determine a word with an alignment probability to the original language word greater than a second threshold to be the candidate word according to the preset language alignment model.

In another implementation of embodiments of the present disclosure, the first determining module 42 is further configured to: determine a plurality of target language type words each corresponding to the original language word in a target field; and determine the plurality of candidate words each corresponding to the original language word according to a linguistic model of each of the plurality of target language type words in the target field.

In another implementation of embodiments of the present disclosure, the second determining module 43 is further configured to: determine a first alignment probability between the original language word and a first candidate word; determine a first score of the first candidate word when used in the sentence to be converted according to a first linguistic model of the first candidate word in a target field; and determine the score of the candidate word when used in the sentence to be converted, according to the first alignment probability and the first score.

In another implementation of embodiments of the present disclosure, the second determining module 43 is further configured to: determine a score of a $j^{th}$ candidate word corresponding to an $i^{th}$ original language word when the $j^{th}$ candidate word is used in the sentence to be converted, according to an alignment probability between the $i^{th}$ original language word and the $j^{th}$ candidate word, a preset parameter, and a score of the $j^{th}$ candidate word in the target field to which the sentence to be converted belongs, where the score of the $j^{th}$ candidate word in the target field to which the sentence to be converted belongs is determined according to a linguistic model of the $j^{th}$ candidate word in the target field to which the sentence to be converted belongs.

It should be noted that, explanations and illustrations made above for embodiments with respect to the language conversion method based on AI also apply to the language conversion device based on AI in this embodiment, and will not be elaborated herein.

With the language conversion device based on AI according to embodiments of the present disclosure, the plurality of candidate words each corresponding to an original language word are determined firstly according to the language conversion request received and the preset rule, the score of each of the plurality of candidate words when used in the sentence to be converted is determined secondly, and the target word corresponding to the original language word is determined finally according to the score of each of the plurality of candidate words. Therefore, with the alignment model and the linguistic model, conversion from the sentence to be converted which includes the original language word and the target language word to the target language type sentence is realized with simplified user's operations and improved conversion efficiency and accuracy, thereby better meeting user requirements and improving the user experience.

Figure 5:
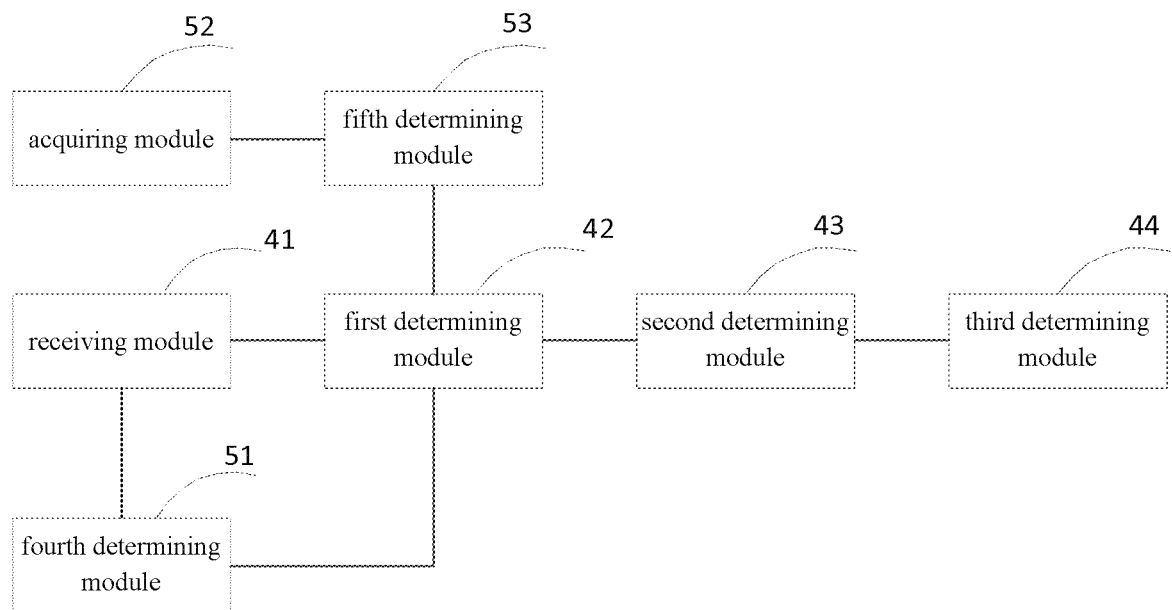
FIG. 5 is a schematic diagram of a language conversion device based on AI according to another embodiment of the present disclosure.

FIG. 5 is a schematic diagram of a language conversion device based on AI according to another embodiment of the present disclosure.

As shown in FIG. 5, on the basis of FIG. 4, the language conversion device based on AI further includes: a fourth determining module 51, an acquiring module 52, a fifth determining module 53.

The fourth determining module 51 is configured to determine the original language word and the target language word according to the number of words in each language type in the sentence to be converted.

The acquiring module 52 is configured to acquire a parallel corpus between an original language type word and a target language type word in a general field.

The fifth determining module 53 is configured to train the parallel corpus and determine an alignment model corresponding to the original language word.

It should be noted that, explanations and illustrations made above for embodiments with respect to the language conversion method based on AI also apply to the language conversion device based on AI in this embodiment, and will not be elaborated herein.

With the language conversion device based on AI according to embodiments of the present disclosure, the plurality of candidate words each corresponding to an original language word are determined firstly according to the language conversion request received and the preset rule, the score of each of the plurality of candidate words when used in the sentence to be converted is determined secondly, and the target word corresponding to the original language word is determined finally according to the score of each of the plurality of candidate words. Therefore, with the alignment model and the linguistic model, conversion from the sentence to be converted which includes the original language word and the target language word to the target language type sentence is realized with simplified user's operations and improved conversion efficiency and accuracy, thereby better meeting user requirements and improving the user experience.

In embodiments of a third aspect of the present disclosure, there is provided a terminal, including: a processor; and a memory having stored therein computer programs that, when executed by the processor, causes the processor to perform the language conversion method based on AI as described in embodiments of the first aspect of the present disclosure.

In embodiments of a fourth aspect of the present disclosure, there is provided a computer-readable storage medium having stored therein computer programs that, when executed by a processor, causes the processor to perform the language conversion method based on AI as described in embodiments of the first aspect of the present disclosure.

In a fifth aspect of the present disclosure, there is provided a computer program product having stored therein instructions that, when executed by a processor, causes the processor to perform the language conversion method based on AI as described in embodiments of the first aspect of the present disclosure.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the phrase of "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The storage medium mentioned above may be read-only memories, magnetic disks, CD, etc. Although explanatory embodiments have been shown and described hereinbefore, it would be appreciated by those skilled in the art that the above embodiments are explanatory and illustrative, cannot be construed to limit the present disclosure, and changes, alternatives, and modifications can be made in the embodiments without departing from spirit, principles and scope of the present disclosure.

What is claimed is:

1. A language conversion method based on artificial intelligence AI, comprising:
receiving a language conversion request, wherein the language conversion request comprises a sentence to be converted, and the sentence to be converted comprises an original language word and a target language word;
determining a plurality of candidate words each corresponding to the original language word according to a preset rule;
determining a score of each of the plurality of candidate words when used in the sentence to be converted; and determining a target word corresponding to the original language word according to the score of each of the plurality of candidate words;

wherein determining a plurality of candidate words each corresponding to the original language word according to a preset rule comprises:
determining the plurality of candidate words each corresponding to the original language word according to a preset language alignment model; or
determining the plurality of candidate words each corresponding to the original language word according to a linguistic model;

wherein the language conversion method further comprises, prior to determining the plurality of candidate words each corresponding to the original language word according to a preset language alignment model:
acquiring a parallel corpus between an original language type word and a target language type word in a general field; and
training the parallel corpus and determining an alignment model corresponding to the original language word; and wherein determining the plurality of candidate words each corresponding to the original language word according to a linguistic model comprises:
determining a plurality of target language type words each corresponding to the original language word in a target field; and
determining the plurality of candidate words each corresponding to the original language word according to a linguistic model of each of the plurality of target language type words in the target field.

2. The language conversion method according to claim 1, wherein a ratio of the original language word to the target language word in the sentence to be converted is lower than a first threshold.

3. The language conversion method according to claim 1, further comprising:
determining the original language word and the target language word according to the number of words in each language type in the sentence to be converted.

4. The language conversion method according to claim 1, wherein determining the plurality of candidate words each corresponding to the original language word according to a preset language alignment model comprises:
determining a word with an alignment probability to the original language word greater than a second threshold to be one of the plurality of candidate words according to the preset language alignment model.

5. The language conversion method according to claim 1, wherein determining a score of each of the plurality of candidate words when used in the sentence to be converted comprises:
determining a first alignment probability between the original language word and a first candidate word;
determining a first score of the first candidate word when used in the sentence to be converted according to a first linguistic model of the first candidate word in a target field; and
determining the score of the first candidate word when used in the sentence to be converted, according to the first alignment probability and the first score.

6. The language conversion method according to claim 5, wherein determining the score of the first candidate word when used in the sentence to be converted, according to the first alignment probability and the first score comprises:

determining a score of a $j^{th}$ candidate word corresponding to an $i^{th}$ original language word when the $j^{th}$ candidate word is used in the sentence to be converted, according to an alignment probability between the $i^{th}$ original language word and the $j^{th}$ candidate word, a preset parameter, and a score of the $j^{th}$ candidate word in a target field to which the sentence to be converted belongs,
where the score of the $j^{th}$ candidate word in the target field to which the sentence to be converted belongs is determined according to a linguistic model of the $j^{th}$ candidate word in the target field to which the sentence to be converted belongs.

7. A language conversion device based on artificial intelligence AI, comprising:
one or more processors;
a memory;
one or more software modules stored in the memory and executed by the one or more processors, and comprising:
a receiving module, configured to receive a language conversion request, wherein the language conversion request comprises a sentence to be converted, and the sentence to be converted comprises an original language word and a target language word;
a first determining module, configured to determine a plurality of candidate words each corresponding to the original language word according to a preset rule;
a second determining module, configured to determine a score of each of the plurality of candidate words when used in the sentence to be converted; and
a third determining module, configured to determine a target word corresponding to the original language word according to the score of each of the plurality of candidate words;
wherein the first determining module is specifically configured to:
determine the plurality of candidate words each corresponding to the original language word according to a preset language alignment model; or
determine the plurality of candidate words each corresponding to the original language word according to a linguistic model;
wherein the one or more software modules further comprises:
an acquiring module, configured to acquire a parallel corpus between an original language type word and a target language type word in a general field; and
a fifth determining module, configured to train the parallel corpus and determine an alignment model corresponding to the original language word; and
wherein the first determining module is further configured to:
determine a plurality of target language type words each corresponding to the original language word in a target field; and
determine the plurality of candidate words each corresponding to the original language word according to a linguistic model of each of the plurality of target language type words in the target field.

8. The language conversion device according to claim 7, wherein a ratio of the original language word to the target language word in the sentence to be converted is lower than a first threshold.

9. The language conversion device according to claim 7, further comprising:

a fourth determining module, configured to determine the original language word and the target language word according to the number of words in each language type in the sentence to be converted.

10. The language conversion device according to claim 7, wherein the first determining module is further configured to:

determine a word with an alignment probability to the original language word greater than a second threshold to be one of the plurality of candidate words according to the preset language alignment model.

11. The language conversion device according to claim 7, wherein the second determining module is further configured to:

determine a first alignment probability between the original language word and a first candidate word;

determine a first score of the first candidate word when used in the sentence to be converted according to a first linguistic model of the first candidate word in a target field; and determine the score of the first candidate word when used in the sentence to be converted, according to the first alignment probability and the first score.

12. The language conversion device according to claim 11, wherein the second determining module is further configured to:

determine a score of a $j^{th}$ candidate word corresponding to an $i^{th}$ original language word when the $j^{th}$ candidate word is used in the sentence to be converted, according to an alignment probability between the $i^{th}$ original language word and the $j^{th}$ candidate word, a preset parameter, and a score of the $j^{th}$ candidate word in a target field to which the sentence to be converted belongs, where the score of the $j^{th}$ candidate word in the target field to which the sentence to be converted belongs is determined according to a linguistic model of the $j^{th}$ candidate word in the target field to which the sentence to be converted belongs.

13. A non-transitory computer-readable storage medium having stored therein computer programs that, when executed by a processor, causes the processor to perform a language conversion method based on artificial intelligence AI, the language conversion method based on artificial intelligence AI comprising:

receiving a language conversion request, wherein the language conversion request comprises a sentence to be converted, and the sentence to be converted comprises an original language word and a target language word;

determining a plurality of candidate words each corresponding to the original language word according to a preset rule;

determining a score of each of the plurality of candidate words when used in the sentence to be converted; and determining a target word corresponding to the original language word according to the score of each of the plurality of candidate words;

wherein determining a plurality of candidate words each corresponding to the original language word according to a preset rule comprises:

determining the plurality of candidate words each corresponding to the original language word according to a preset language alignment model; or determining the plurality of candidate words each corresponding to the original language word according to a linguistic model;

wherein the language conversion method further comprises, prior to determining the plurality of candidate words each corresponding to the original language word according to a preset language alignment model:

acquiring a parallel corpus between an original language type word and a target language type word in a general field; and training the parallel corpus and determining an alignment model corresponding to the original language word; and wherein determining the plurality of candidate words each corresponding to the original language word according to a linguistic model comprises:

determining a plurality of target language type words each corresponding to the original language word in a target field; and determining the plurality of candidate words each corresponding to the original language word according to a linguistic model of each of the plurality of target language type words in the target field.

14. The non-transitory computer-readable storage medium according to claim 13, wherein the language conversion method based on artificial intelligence AI further comprises:

determining the original language word and the target language word according to the number of words in each language type in the sentence to be converted.

15. The non-transitory computer-readable storage medium according to claim 13, wherein a ratio of the original language word to the target language word in the sentence to be converted is lower than a first threshold.

16. The non-transitory computer-readable storage medium according to claim 13, wherein determining the plurality of candidate words each corresponding to the original language word according to a preset language alignment model comprises:

determining a word with an alignment probability to the original language word greater than a second threshold to be one of the plurality of candidate words according to the preset language alignment model.

17. The non-transitory computer-readable storage medium according to claim 13, wherein determining a score of each of the plurality of candidate words when used in the sentence to be converted comprises:

determining a first alignment probability between the original language word and a first candidate word;

determining a first score of the first candidate word when used in the sentence to be converted according to a first linguistic model of the first candidate word in a target field; and determining the score of the first candidate word when used in the sentence to be converted, according to the first alignment probability and the first score.

18. The non-transitory computer-readable storage medium according to claim 17, wherein determining the score of the first candidate word when used in the sentence to be converted, according to the first alignment probability and the first score comprises:

determining a score of a $j^{th}$ candidate word corresponding to an $i^{th}$ original language word when the $j^{th}$ candidate word is used in the sentence to be converted, according to an alignment probability between the $i^{th}$ original language word and the $j^{th}$ candidate word, a preset parameter, and a score of the $j^{th}$ candidate word in a target field to which the sentence to be converted belongs, where the score of the $j^{th}$ candidate word in the target field to which the sentence to be converted belongs is determined according to a linguistic model of the $j^{th}$ candidate word in the target field to which the sentence to be converted belongs.

\* \* \* \* \*